United States Patent [19]
Bon et al.

[11] Patent Number: 4,764,286
[45] Date of Patent: Aug. 16, 1988

[54] CATALYTIC DECOMPOSITION OF SODIUM HYPOCHLORITE IN HIGHLY ALKALINE SOLUTIONS

[75] Inventors: Charles K. Bon, Concord; Vera M. Knowles, Martinez, both of Calif.

[73] Assignee: The Dow Chemical Company, Midland, Mich.

[21] Appl. No.: 878,733

[22] Filed: Jun. 26, 1986

[51] Int. Cl.⁴ ............................ C02F 1/70; C02F 1/72
[52] U.S. Cl. .................................. 210/757; 210/763; 210/766
[58] Field of Search ............... 210/749, 756, 757, 763, 210/766, 902; 423/499

[56] References Cited

U.S. PATENT DOCUMENTS

| | | | |
|---|---|---|---|
| 3,965,249 | 6/1976 | Kinosz | 210/754 |
| 4,073,873 | 2/1978 | Caldwell et al. | 423/499 |
| 4,297,333 | 10/1981 | Crawford et al. | 210/756 |
| 4,400,304 | 8/1983 | Clark et al. | 210/763 |

FOREIGN PATENT DOCUMENTS 5531423  3/1985  Japan.

OTHER PUBLICATIONS

V. S. Landbe et al., "A Note on the Catalytic Decomposition of Waste Sodium Hypochlorite Solution," *Water Research*, vol. 9, pp. 1009-1010, Pergammon Press (1975).

*Primary Examiner*—Ivars Cintins

[57] ABSTRACT

The present invention relates to a method of catalytically decomposing sodium hypochlorite in an aqueous alkaline solution to oxygen and chloride ion. Specifically, the present invention discloses a method of decomposing aqueous hypochlorite into oxygen and chloride in a solution having a pH value greater than 13 using a solid catalyst comprising nickel oxide, cobalt oxide or mixtures thereof on an inorganic support selected from magnesium oxide or titanium oxide. The resulting sodium chloride solution may be recovered and used further.

20 Claims, 1 Drawing Sheet

CATALYTIC DECOMPOSITION OF SODIUM HYPOCHLORITE IN HIGHLY ALKALINE SOLUTIONS

BACKGROUND OF THE INVENTION

1. Field of the Invention

The invention relates to a method of catalytically decomposing an aqueous hypochlorite solution to oxygen and chloride ion. More specifically, the present invention discloses a method of decomposing aqueous hypochlorite into oxygen and chloride in a solution having a pH value larger than 13, using a catalyst comprising nickel oxide, cobalt oxide or mixtures thereof deposited on an inorganic support, such as magnesium oxide or titanium oxide.

2. Art of Interest

In the decomposition of hypochlorite solutions by solid catalytic means, a continuing problem is encountered when the hypochlorite has a pH of 13 or greater. The usual inorganic catalyst supports disintegrate quickly under these conditions.

In U.S. Pat. No. 4,400,304, R. T. Clark et al. disclose a porous catalyst matrix which is used for the decomposition of aqueous hypochlorite solutions. The catalyst is prepared by sintering a powdered mixture of a particular metal oxide or hydroxide and a thermoplastic polyolefin or halogenated polyolefin.

In U.S. Pat. No. 4,073,873, D. C. Caldwell et al. disclose a process for the catalytic decomposition of hypochlorite by the action of a single-metal spinel of $Co_3O_4$, preferably coated on an inert stable support. The $Co_3O_4$ catalyst may contain dispersed therein, optionally, the other "modifier" metal oxides which do not affect the single-metal spinel structure of $Co_3O_4$, but which contribute better adherence of the $Co_3O_4$ to the substrate and improve the toughness of the $Co_3O_4$ coating.

In U.S. Pat. No. 3,965,249, D. L. Kinosz discloses the use of an unsupported catalyst to convert hypochlorite to chloride. The decomposition of the hypochlorite occurs at a temperature of between 20° C. and the boiling point of the solution at a pH of between 7-13. The catalyst, selected from salts, fused metal or metal powders of cobalt, nickel, copper or calcium, is converted into a finely divided oxide. This process does not have any organic or inorganic support because the support usually disintegrates at pH values of 10-12. Further, the patent indicates that with certain supports there is no benefit and actually some detriment using zeolite supports.

In U.S. Pat. No. 4,297,333, R. A. Crawford et al. disclose a process for the decomposition of hypochlorite to oxygen and chloride ion in an aqueous solution using a porous solid catalyst of nickel (II) oxide and bimetal $NiCo_2O_4$ spinel. The patent does not disclose the decomposition of aqueous hypochlorite solutions having a pH of 13 or higher.

In *Water Research*, Vol. 9, pp. 1009-1010, Pergamon Press in 1975, V. S. Londbe et al. disclose a catalytic batch process for the controlled decomposition of waste sodium hypochlorite solutions. The catalysts examined were cobalt metal and cobalt acetate without a support at a concentration of about 200 ppm. The process examined the effects of temperature and time.

Based upon this art, it would be extremely useful to have a supported catalyst for the continuous decomposition of hypochlorite in highly alkaline solutions having a pH of 13 or higher. The catalyst support presently used usually decomposes quickly under these high pH conditions. The present invention provides an active catalyst on a inorganic support which is stable in highly alkaline conditions.

SUMMARY OF THE INVENTION

The present invention relates to a process for treating aqueous sodium hypochlorite and chlorine-containing liquid having a pH greater than 13 to convert the hypochlorite and dissolved chlorine therein into chloride, which process involves: (a) contacting the aqueouus hypochlorite and chlorine-containing liquid with a solid catalyst comprising cobalt oxide, nickel oxide or mixtures thereof an an inorganic support comprising magnesium oxide or titanium oxide or mixtures thereof; and (b) recovering the essentially hypochlorite- and chlorine-free aqueous solution.

DETAILED DESCRIPTION OF THE INVENTION AND PREFERRED EMBODIMENTS

Figure 1:
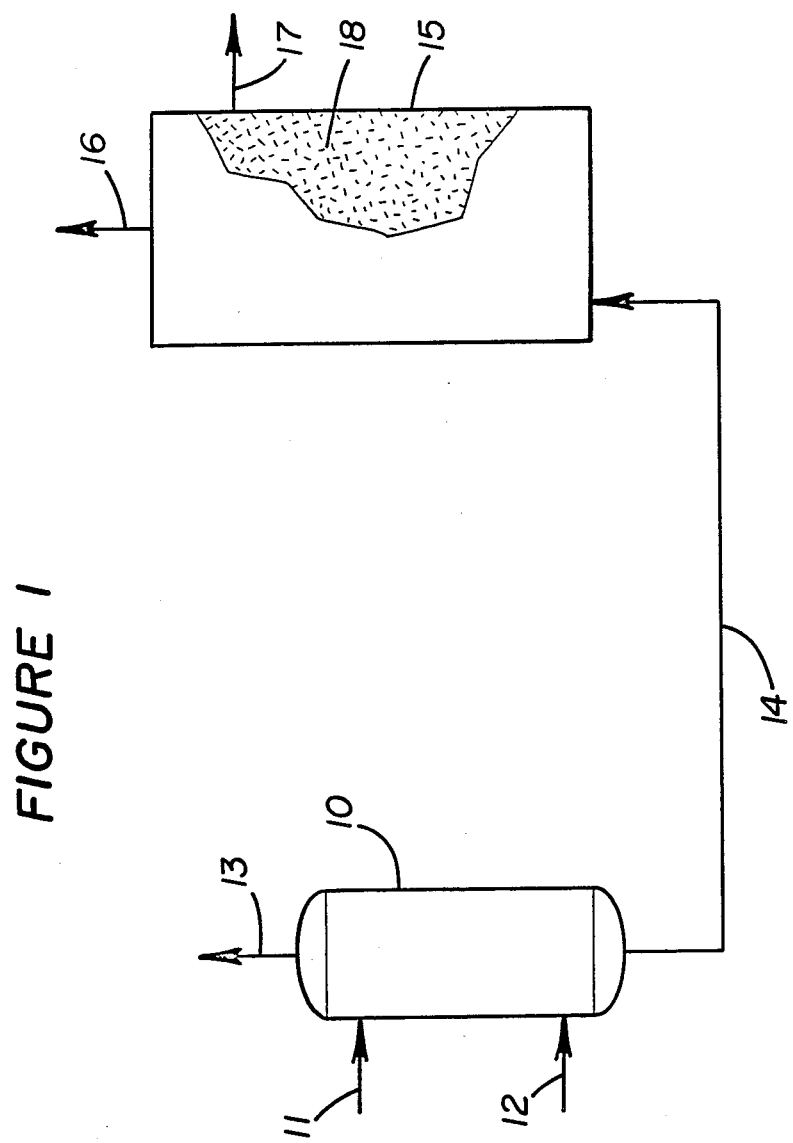
FIG. 1 is a schematic of one embodiment of the process of the present invention.

The hypochlorite containing aqueous solutions which are treated in the present invention may be any aqueous solution which contains hypochlorite moieties, e.g. hypochlorous acid or salts of hypochlorous acids, alkali metal hypochlorites and the like.

A well-known source of aqueous streams containing hypochlorite ion as a waste stream in the aqueous scrubbing of a chlorine liquefaction plant where the non-condensible ("tail gas") gases are scrubbed with a highly caustic solution to prevent the residual chlorine in the "tail gas" from being emitted to the atmosphere. Other sources of aqueous waste waters containing hypochlorite which can be treated by the method of the present invention are found in the manufacture of chlorine-caustic and dry bleach. These aqueous hypochlorite solutions are corrosive to many metals and are highly toxic to aquatic life. Before these streams can be released to the public waters in the environment, they must be treated to remove the hypochlorite.

The methods of treating various hypochlorite streams using a fixed bed reactor are known and do not, as such, constitute a part of this invention. Similarly, as is disclosed above, a variety of catalytic materials suitable for the decomposition of hypochlorite ion are known. The use of certain combinations of catalysts and catalyst supports are part of the present invention.

With reference to FIG. 1, crude chlorine-containing gas enters the packed scrubber 10 via line 12 and is scrubbed by sodium hydroxide solution. A typical gas stream in line 12 is about 82% air, 10% carbon dioxide and 8% chlorine. The aqueous sodium hydroxide solution enters via line 11 while the scrubbed chlorine gas exits via line 13. A typical composition of the solution entering reactor 10 via line 11 is 10% sodium chloride, 8 to 12% sodium hydroxide (as the hydroxyl) and the remainder is water. The pH of the solution is generally 13 or preferably greater than 13. The gases leaving reactor 10 via line 13 are generally 89% air, 11% carbon dioxide and less than 100 ppm of chlorine gas. The use of the caustic scrubbers to reduce chlorine gas emissions are known in the art.

The aqueous sodium hydroxide solution wets the packing material in scrubber 10 and the chlorine-containing gas bubbles up through the column and exits through line 13. Any number of means such as mixing, glass beads, faling film and the like may be used as scrubber 10 to obtain sufficient contact with the chlorine-containing stream.

The aqueous effluent containing sodium hydroxide, and sodium hypochlorite is conveyed via line 14 to the decomposition up-flow reactor 15 which is usually maintained at between 10° and 80° C. The composition of the solution in line 14 is generally 1700 ppm of sodium hypochlorite, 11% sodium hydroxide, 10% sodium chloride, and 3600 ppm of sodium carbonate. The rate of solution in line 14 is about 20 gal/minute. A preferred temperature range is from about ambient to about 80° C., and a more preferred temperature range is between about 35° and 45° C., and most preferred range is between about 40° and 45° C.

Within the decomposition tank 15, is found the metal catalyst deposited on solid inorganic substrate 18. More specifically, the catalyst is cobalt oxide, nickel oxide or mixtures thereof. The solid substrate is selected from magnesium oxide or titanium oxide or mixtures thereof.

The residence time in decomposition tank 15 is determined by Stokian flow velocity up through the reactor. The decomposition is performed at a temperature and for a time effective to essentially decompose the hypochlorite present. For this application, the residence time is generally between about 60 and 70 minutes, and times of between about 30 and 90 minutes have proved effective. During this period the sodium hypochlorite with the aid of the metal catalyst is decomposed into free oxygen which exits from reactor 15 via line 16, and sodium chloride which exits from 15 via line 17 as an aqueous sodium chloride solution. Generally, the composition of the aqueous solution exiting in line 17 is less than 4 ppm sodium hypochlorite, about 3600 ppm of sodium carbonate, 11% sodium hydroxide and 10% sodium chloride.

The primary reaction taking place may be represented by the net overall equation:

$$2\text{NaOCl}_{(aq)} \xrightarrow{\text{catalyst}} 2\text{NaCl}_{(s)} + \text{O}_2(g)$$

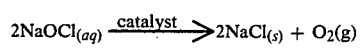

The resulting aqueous product should be substantially non-polluting for hypochlorite. If hypochlorite remains in the aqueous solution in line 17, one or more additional decomposition tanks may be placed in series with reactor 15 so that the hypochlorite is removed as desired. In this manner, an efficient continuous decomposition of hypochlorite is obtained.

Generally, reactor 15 is sized to accommodate the flow of solution entering in line 14. One size reactor is about 1200 gallons in volume filled with the catalyst/substrate particles of 0.13 in diameter. The reactor is designed for Stokian flow around the catalyst pellets, and has a diameter of about 6 feet and a length of about 6 feet.

Substances which have been disclosed as suitable for catalyzing the decomposition of hypochlorite include oxides or hydroxides of iron, copper, magnesium, nickel or cobalt. In the present invention, nickel oxide or mixtures thereof are preferred.

A number of materials suitable as catalyst supports are disclosed including silica, diatomaceous earth, alkaline earth metal and alkali metal silicates, aluminas, silicates and mixed aluminum compounds of oxides, hydroxides and silicates, magnesia and mixed magnesium compounds of oxides, hydroxides and silicates. In the present invention an inorganic support of magnesium oxide available from Harshaw Chemical Co., Cleveland, Ohio as Mg-0601% (⅛ in) is preferred. The chloride value produced in the present invention may be recovered from the aqueous solution and used in other manufacturing processes. The titanium oxide is also available from Harshaw Chemical of Cleveland, Ohio as Ti-0720T (⅛ in).

It is the form and type of catalyst and inorganic support and its use in the decomposition of hypochlorite in highly caustic solution, pH greater than 13, that forms the basis of this invention. In the present invention, catalyst for the decomposition of hypochlorite are combined with an inorganic support to form a catalyst matrix in small particle or pellet form which is turn utilized in the process of decomposing hypochlorite in highly basic solutions. Titanium oxide is preferred for some specific applications such as, for higher reaction temperatures, e.g., 50°-80° C.

The ratio between the metal catalyst capable of decomposing hypochlorite and the inorganic support may vary but is usually within about 1 to 6 percent by weight of the catalyst (as the metal) to the total weight of catalyst (as the oxide) and support. Ratios of about 1.5 to 3.5 percent by weight of catalyst (as the metal), to the total weight of catalyst (as the oxide) and support, are generally preferred as they have excellent activity and high affinity to remain bonded to the support.

The ratio of the catalyst to hypochlorite concentration will vary due to inlet and desired outlet sodium hypochlorite concentrations. The first order half-life observed for the decomposition is about 6.3 minutes. This and the other relative volume of the stream to be treated will determine the reactor size for a Stokian up-flow reactor.

The preferred temperatures of the present invention have been described above.

The following Examples are to be construed as illustrative of the present invention and not limiting thereof.

EXAMPLE 1

Preparation of the Catalyst and Support

Magnesium oxide catalyst support (described hereinabove from Harshaw Chemical Company) is heated at 200° C. for 4.5 hours and cooled in a dessicator overnight. The dried support is soaked in a 3% catalyst (as the metal) to catalyst support (weight/weight) by weight of cobalt as cobalt acetate hydrate (CoAc$_2$.4-H$_2$O, 0.10 g/ml) dissolved in water (100 ml) and glacial acetic acid (0.5 g) for 3 days (about 72 hours). The catalyst and support are then air dried and heated to 130° C. for 1.5 hours and cooled in a desiccator. The catalyst and support are next soaked in 10% sodium hydroxide for 1 hr, to obtain the black oxide form of the cobalt metal, and then allowed to air dry.

EXAMPLE 2

Reaction of Catalyst and Hypochlorite Solution

The cobalt oxide catalyst on magnesium oxide support of Example 1 (25 g, a 3% loading of cobalt as cobalt oxide) is treated with an aqueous sodium hydroxide (pH 13) and sodium hypochlorite solution (4,000 to 11,000 ppm). The rate of the aqueous solution is about 0.3 ml/sec in a 25-ml reactor at 40° C. and also at 45° C.

The aqueous solution exiting the reactor contains less than 10 ppm of hypochlorite.

EXAMPLES 3-34

Reaction of Catalyst and Hypochlorite Solution

The procedure described in Example 2 is followed using a total 25 g of catalyst on the inorganic support, and the catalyst/support ratio is 3% catalyst/support or catalyst/catalyst and support (w/w), the temperatures and flow rates in ml/sec are varied. In Experiments Nos. 19-34, Ni, Co, Ni—Cu, Ni—Co, etc. describes the amount of elemental metal present (although the metal is present as the oxide) in each catalyst or catalyst mixture. Thus, in Experiment No. 27, nickel and cobalt are present in a 1 to 1 ratio as the amount metal present, where each metal is present as its respective oxide. The total of the catalyst present 3 weight percent (as the metals) of the total weight of the catalyst and the inorganic support.

TABLE 1
CATALYTIC DECOMPOSITION OF AQUEOUS HYPOCHLORITE SOLUTIONS

| No. | Catalyst/Support | Temp °C. | Flow (a) ml/sec | IN NaOCl ppm | OUT NaOCl ppm | Reaction Time (b) (sec) | K × 10⁻³ | Half Life (c) (sec) | Half Life (d) (min) |
|---|---|---|---|---|---|---|---|---|---|
| 3 | Ni/TiO$_2$ | 40 | 0.348 | 2509.5 | 2307.4 | 143.5 | 0.564 | 1184.9 | 19.75 |
| 4 | Ni/TiO$_2$ | 40 | 0.355 | 2509.5 | 2363.4 | 140.8 | 0.426 | 1627.6 | 27.13 |
| 5 | Co/TiO$_2$ | 43 | 0.347 | 10888.9 | 10238.9 | 144.2 | 0.427 | 1624.4 | 27.07 |
| 6 | Co/TiO$_2$ | 37.5 | 0.361 | 10888.9 | 10583.6 | 138.2 | 0.292 | 3426.6 | 57.19 |
| 7 | Co/TiO$_2$ | 45 | 0.348 | 4933 | 4442.3 | 143.5 | 0.730 | 949.6 | 15.83 |
| 8 | Co/TiO$_2$ | 37 | 0.359 | 4983.2 | 4755.2 | 139.5 | 0.334 | 2065.2 | 34.42 |
| 9 | Co/TiO$_2$ | 45 | 0.347 | 6225.6 | 5633.6 | 144.2 | 0.693 | 1000.5 | 16.68 |
| 10 | Co/TiO$_2$ | 39 | 0.357 | 6225.6 | 5641 | 140.2 | 0.793 | 983.4 | 16.42 |
| 11 | Co/MgO$_2$ | 40 | 0.348 | 4932.9 | 3789.2 | 143.5 | 1.840 | 377.2 | 6.24 |
| 12 | Co/MgO$_2$ | 40 | 0.359 | 4932.9 | 3938.4 | 139.5 | 1.610 | 429.6 | 7.16 |
| 13 | Co/MgO$_2$ | 45 | 0.347 | 7139.8 | 6882 | 144.2 | 0.255 | 2718.5 | 45.39 |
| 14 | Co/MgO$_2$ | 40 | 0.358 | 7139.8 | 6965.8 | 139.5 | 0.177 | 3920.1 | 65.34 |
| 15 | Ni/MgO$_2$ | 42 | 0.347 | 7109.2 | 6928.9 | 144.2 | 0.178 | 3991.7 | 64.86 |
| 16 | Ni/MgO$_2$ | 44 | 0.359 | 7109.2 | 6860.4 | 139.5 | 0.255 | 2715.0 | 45.25 |
| 17 | Ni/MgO$_2$ | 43.5 | 0.348 | 4055.8 | 3885.2 | 143.5 | 0.299 | 2315.3 | 38.59 |
| 18 | Ni/MgO$_2$ | 43 | 0.355 | 4055.6 | 3963 | 140.9 | 0.164 | 4217.7 | 70.30 |
| 19(e) | Ni—Cu/MgO$_2$ | 42 | 0.348 | 4081 | 3867.7 | 143.5 | 0.374 | 1853.4 | 30.89 |
| 20 | Ni—Cu/MgO$_2$ | 45 | 0.359 | 4081 | 3867.1 | 139.5 | 0.385 | 1796.5 | 29.94 |
| 21 | Ni—Cu/MgO$_2$ | 47 | 0.347 | 12053.3 | 11494.6 | 144.2 | 0.332 | 2088.2 | 34.86 |
| 22 | Ni—Cu/MgO$_2$ | 45 | 0.362 | 12053.3 | 11663.8 | 139.2 | 0.241 | 2880.9 | 48.02 |
| 23 | Ni—Cu/MgO$_2$ | 40.5 | 0.349 | 1509.4 | 1409.6 | 143.5 | 0.477 | 1454.5 | 24.24 |
| 24 | Ni—Cu/MgO$_2$ | 40 | 0.363 | 1509.4 | 1469.2 | 137.6 | 0.196 | 3553.6 | 58.89 |
| 25 | Ni—Co/MgO$_2$ | 43 | 0.338 | 2875.9 | 2698.5 | 147.8 | 0.431 | 1600.9 | 26.95 |
| 26 | Ni—Co/MgO$_2$ | 43 | 0.348 | 2875.9 | 2770.2 | 143.5 | 0.269 | 2657.0 | 44.28 |
| 27 | Ni—Co/TiO$_2$ | 44.5 | 0.341 | 1331.5 | 1078.8 | 146.3 | 1.430 | 481.98 | 8.63 |
| 28 | Ni—Co/TiO$_2$ | 35 | 0.352 | 1331.5 | 1066.9 | 142.2 | 1.560 | 444.84 | 7.41 |
| 29 | Ni—Co/TiO$_2$ | 40 | 0.342 | 1652.4 | 1512.4 | 146.3 | 0.685 | 1145.8 | 19.90 |
| 30 | Ni—Co/TiO$_2$ | 30 | 0.351 | 1652.4 | 1640.4 | 142.2 | 0.513 | 13520 | 225.3 |
| 31 | Ni—Cu/TiO$_2$ | 43 | 0.342 | 1769.5 | 1724.1 | 146.3 | 0.173 | 3989.4 | 66.41 |
| 32 | Ni—Cu/TiO$_2$ | 43 | 0.352 | 1769.5 | 1713.8 | 142.1 | 0.222 | 3136.7 | 52.28 |
| 33 | Ni—Cu/TiO$_2$ | 41 | 0.342 | 2922.4 | 2666.3 | 146.3 | 0.627 | 1106.0 | 19.43 |
| 34 | Ni—Cu/TiO$_2$ | 39 | 0.352 | 2922.4 | 2825.1 | 141.2 | 0.239 | 2910.4 | 48.51 |

(a) Value rounded off to three significant figures.
(b) Value rounded off to four significant figures.
(c) Value rounded off to five significant figures.
(d) Value rounded off to four significant figures.
(e) Ni—Cu and Ni—Co ratio 1:1 (w/w)

As can be seen from Table 1, Experiments Nos. 11, 12, 27 and 28 show superior catalytic activity.

While only a few embodiments of the invention have been shown and described herein, it will become apparent to those skilled in the art that various modifications and changes can be made in the process and materials to remove hypochlorite from highly alkaline aqueous streams without departing from the spirit and scope of the present invention. All such modifications and changes coming within the scope of the appended claims are intended to be covered thereby.

We claim:

1. In a process of catalytically decomposing aqueous hypochlorite into oxygen and chloride, in a solution having a pH value larger than 13, which process comprises contacting the aqueous hypochlorite solution with hypochlorite decomposition catalyst, the improvement wherein the catalyst is a plurality of solid pellets comprising an active catalyst and an inorganic support which is stable at a pH value greater than 13 wherein, the active catalyst is selected from nickel oxide, cobalt oxide or mixtures thereof which is deposited on an inorganic support selected from magnesium oxide, titanium oxide or mixtures thereof and the process is conducted between 35° and 45° C.

2. The process of claim 1 wherein the active catalyst is nickel oxide.

3. The process of claim 2 wherein the active catalyst is present in between about 1 and 6 percent by weight of the catalyst and the inorganic support.

4. The process of claim 2 wherein the inorganic support is magnesium oxide.

5. A process for treating aqueous sodium hypochlorite and chlorine-containing liquid to convert the hypochlorite and chlorine therein into oxygen and chloride, which process comprises:
(a) contacting the aqueous hypochlorite and chlorine-containing liquid having a pH value larger than 13 with a solid catalyst, said solid catalyst comprising an active catalyst and inorganic support wherein said active catalyst is cobalt oxide, nickel oxide or mixtures thereof and said inorganic support which is stable at a pH value larger than 13 is magnesium oxide, titanium oxide or mixtures thereof at a temperature of between about ambient and 80° C.; and (b) recovering the essentially hypochlorite and chlorine-free aqueous solution.

6. The process of claim 5 wherein in step (a) the catalyst is nickel oxide and the inorganic support is magnesium oxide.

7. A process for the decomposition of aqueous sodium hypochlorite in highly alkaline media, which process comprises;

(a) contactng an aqueous solution of sodium hypochlorite having a concentration of between about 4,000 and 11,000 ppm hypochlorite an a hydroxyl value of between about 8 and 12 percent by weight, with a solid catalyst comprising an active catalyst and an inorganic support which is stable at a pH value of greater than 13, wherein said active catalyst is cobalt oxide, nickel oxide or mixtures thereof, and said inorganic support is magnesium oxide, titanium oxide or mixtures thereof at a temperature of between about ambient and 80° C. for a time effective to decompose the hypochlorite and chlorine present; and (b) recovering the essentially hypochlorite-free aqueous solution.

8. The process of claim 7 wherein the inorganic support is magnesium oxide.

9. The process of claim 8 wherein the active catalyst is cobalt oxide.

10. The process of claim 9 wherein the cobalt catalyst as cobalt metal on the magnesium oxide support is between about 1.0 and 6.0 percent by weight of the total weight of the catalyst and the support.

11. The process of claim 7 wherein the active catalyst is nickel oxide.

12. The process of claim 11 wherein the inorganic support is magnesium oxide and the nickel catalyst to magnesium oxide support is between about 1.0 and 6.0 percent by weight of the metal of the total weight of the catalyst and the magnesium oxide support.

13. The process of claim 7 wherein the active catalyst i s a mixture of nickel oxide and cobalt oxide.

14. The process of claim 13 wherein the reaction time is between about 30 and 90 minutes.

15. The process of claim 14 wherein the reaction temperature is between about 35° and 45° C.

16. The process of claim 13 wherein the combined catalysts of nickel oxide and cobalt oxide are present in between about 1.0 and 6.0 percent by weight of the metal to the total weight of the catalyst and support.

17. The process of claim 16 wherein the ratio of nickel oxide to cobalt oxide in the combined active catalyst is about 1:1 on a weight-weight basis each metal.

18. The process of claim 7 wherein the reaction time is between about 30 and 90 minutes.

19. The process of claim 18 wherein the reaction temperature is between about 35° and 45° C.

20. A process for treating aqueous sodium hypochlorite and chlorine-containing liquid to convert the hypochlorite and chlorine therein into oxygen and chloride, which process comprises:

(a) contacting the aqueous hypochlorite and chlorine-containing liquid having a pH value larger than 13 with a solid catalyst, said solid catalyst consisting essentially of an active catalyst and inorganic support wherein said active catalyst is cobalt oxide, nickel oxide or mixtures thereof and said inorganic support which is stable at a pH value larger than 13 is magnesium oxide, titanium oxide or mixtures thereof at a temperature of between about ambient and 80° C.; and (b) recovering the essentially hypochlorite and chlorine-free aqueous solution.

* * * * *

UNITED STATES PATENT AND TRADEMARK OFFICE
CERTIFICATE OF CORRECTION

PATENT NO. : 4,764,286

DATED : August 16, 1988

INVENTOR(S) : Charles K. Bon; Vera M. Knowles

It is certified that error appears in the above-identified patent and that said Letters Patent is hereby corrected as shown below:

Col. 2, line 12, "aqueous" has been misspelled;

Col. 2, line 15, delete the word "an" after "thereof" and insert -- on --;

Col. 2, line 67, delete "the";

Col. 3, line 5, "falling" has been misspelled;

Col. 3, line 64, after "nickel oxide" insert -- , cobalt oxide --;

Col. 4, line 6, delete "Mg-0601%" and insert -- Mg-0601T --;

Col. 4, line 16, delete "catalyst" and insert -- catalysts --;

Col. 4, line 18, delete "turn" and insert -- then --;

Col. 4, line 55, "dessicator" has been misspelled;

UNITED STATES PATENT AND TRADEMARK OFFICE
CERTIFICATE OF CORRECTION

PATENT NO.  : 4,764,286
DATED       : August 16, 1988
INVENTOR(S) : Charles K. Bon; Vera M. Knowles It is certified that error appears in the above-identified patent and that said Letters Patent is hereby corrected as shown below:

Col. 5, line 17, after "present" insert -- is --;

In TABLE 1, No. 24, under column "Half Life(c)(sec)", delete "3553.6" and insert -- 3533.6 --;

Col. 7, line 11, delete "contactng" and insert -- contacting --;

Col. 7, line 13, delete "an" and insert -- and --;

Col. 8, line 4, delete "i s" and insert -- is --.

Signed and Sealed this

Twenty-fifth Day of April, 1989

Attest:

DONALD J. QUIGG

Attesting Officer

Commissioner of Patents and Trademarks